US012640412B2

(12) United States Patent
Yamamoto et al.

(10) Patent No.: US 12,640,412 B2
(45) Date of Patent: May 26, 2026

(54) BATTERY MODULE

(71) Applicant: AESC JAPAN LTD., Kanagawa (JP)

(72) Inventors: Yoshimasa Yamamoto, Kanagawa (JP);
Yoshiyuki Yamada, Kanagawa (JP);
Mitsuyuki Okamura, Kanagawa (JP);
Tsubasa Anbai, Kanagawa (JP);
Xiaoying Fan, Kanagawa (JP)

(73) Assignee: AESC JAPAN LTD., Kanagawa (JP)

( * ) Notice: Subject to any disclaimer, the term of this
patent is extended or adjusted under 35
U.S.C. 154(b) by 522 days.

(21) Appl. No.: 18/177,252

(22) Filed: Mar. 2, 2023

(65) Prior Publication Data

US 2023/0318061 A1      Oct. 5, 2023

(30) Foreign Application Priority Data

Mar. 31, 2022      (JP) ................................. 2022-059749

(51) Int. Cl.
H01M 10/48          (2006.01)
H01M 10/658         (2014.01)
(52) U.S. Cl.
CPC ....... H01M 10/486 (2013.01); H01M 10/658
(2015.04)

(58) Field of Classification Search
CPC .......................... H01M 10/486; H01M 10/658
See application file for complete search history.

(56) References Cited

U.S. PATENT DOCUMENTS

| | | |
|---|---|---|
| 2006/0028183 A1 | 2/2006 | Izawa et al. |
| 2017/0125866 A1* | 5/2017 | Zhou ................. H01M 8/04067 |

FOREIGN PATENT DOCUMENTS

| | | |
|---|---|---|
| CN | 111092277 A | 5/2020 |
| EP | 4131609 A1 | 2/2023 |
| JP | 2003-229110 A | 8/2003 |
| JP | 2006-35942 A | 2/2006 |
| JP | 2009-181853 A | 8/2009 |
| JP | 2014-026752 A | 2/2014 |
| JP | 2018-179938 A | 11/2018 |
| JP | 2019-185846 A | 10/2019 |

* cited by examiner

*Primary Examiner* — Olatunji A Godo
(74) *Attorney, Agent, or Firm* — Rankin, Hill & Clark
LLP

(57) ABSTRACT

A battery module includes a battery, a structure positioned at
least partially around the battery, a temperature sensor
positioned between the battery and the structure, and a
directing portion directing a temperature detection range of
the temperature sensor toward the battery.

20 Claims, 5 Drawing Sheets

10

BATTERY MODULE

This application is based on Japanese patent application NO. 2022-059749, filed on Mar. 31, 2022, the content of which is incorporated hereinto by reference.

BACKGROUND

Technical Field

The present invention relates to a battery module.

In recent years, various battery modules including a temperature sensor for detecting the temperature of a battery have been developed. A battery module described in Japanese Patent Application Publication No. 2018-179938 (PTL 1), for example, includes a thermally conductive plate in contact with the surface of a cylindrical battery. The thermally conductive plate surrounds a temperature sensor.

SUMMARY

A structure regulating the temperature of a battery by cooling or heating, for example, may be provided around the battery. In this case, for example, in the battery module described in PTL 1, the difference between the actual temperature of the battery and the detected temperature of the temperature sensor for detecting the temperature of the battery may relatively increase due to the difference between the temperature of the battery and the temperature of the structure.

An example of an object of the present invention is to decrease the difference between the actual temperature of a battery and the detected temperature of a temperature sensor for detecting the temperature of the battery. Other objects of the present invention will become apparent from the description herein.

An aspect of the present invention is a battery module. The battery module includes a battery, a structure positioned at least partially around the battery, a temperature sensor positioned between the battery and the structure, and a directing portion directing a temperature detection range of the temperature sensor toward the battery.

Another aspect of the present is a battery module. The battery module includes a battery, a structure positioned at least partially around the battery, a temperature sensor positioned between the battery and the structure, and a thermal shield element at least partially positioned between the temperature sensor and the structure.

The aspects of the present invention can decrease the difference between the actual temperature of the battery and the detected temperature of the temperature sensor for detecting the temperature of the battery.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

An embodiment and a variant of the present invention will be described below by using drawings.

In every drawing, similar components are given similar signs, and description thereof is omitted as appropriate.

Figure 1:
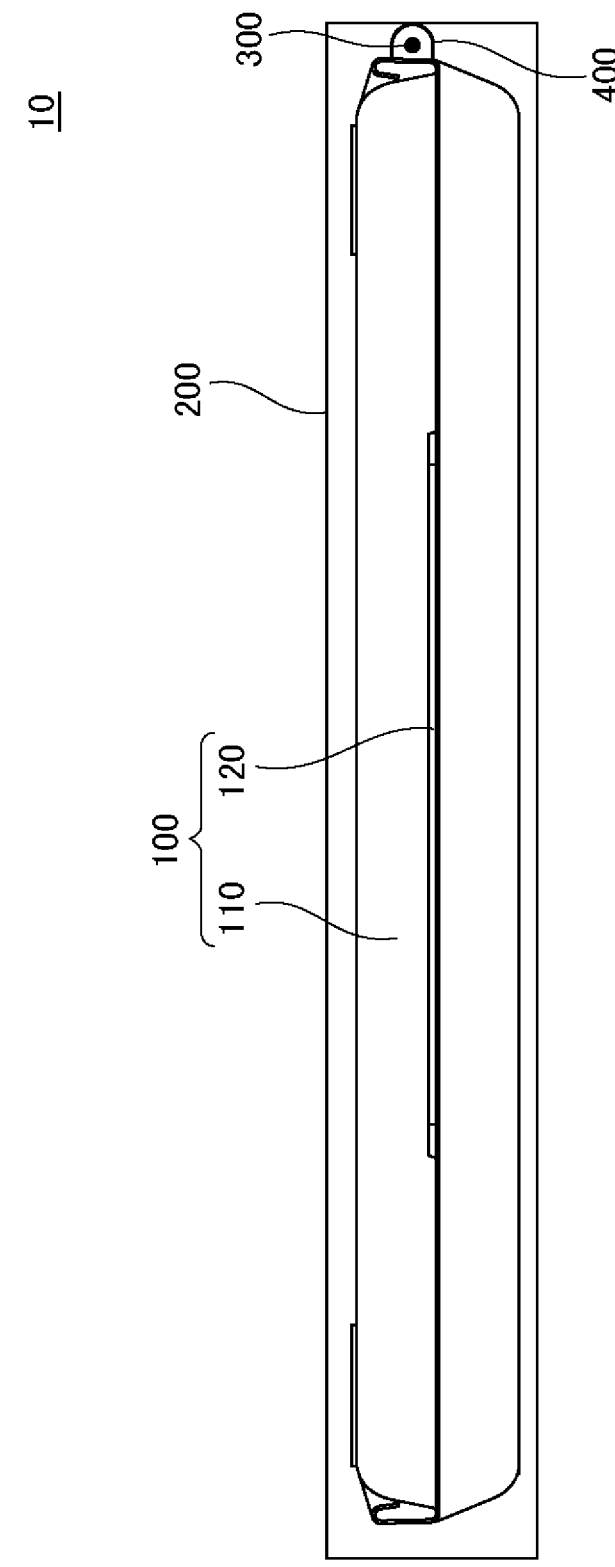
FIG. 1 is a front view of a battery module according to an embodiment.

FIG. 1 is a front view of a battery module 10 according to the embodiment.

The battery module 10 according to the embodiment includes a battery 100, a structure 200, a temperature sensor 300, and a thermal shield element 400. The battery 100 includes an exterior material 110 and a lead 120.

For purposes of discussion, hereinafter, the front side of the page in FIG. 1 refers to the front of the battery 100, and the back side of the page in FIG. 1 refers to the back of the battery 100. Note that the direction of each of the front and the back of the battery 100 varies according to placement of the battery 100 in use of the battery 100.

The battery 100 according to the embodiment is a lamination type lithium-ion secondary battery. The battery 100 includes a stacked body including an unillustrated positive electrode, an unillustrated negative electrode, and an unillustrated separator as a battery element. The stacked body is sealed by the exterior material 110. One of the positive electrode and negative electrode is electrically connected to the lead 120. The lead 120 is withdrawn frontward from the front of the exterior material 110. The other of the positive electrode and the negative electrode is electrically connected to an unillustrated lead provided on the back of the exterior material 110. The unillustrated lead provided on the back of the exterior material 110 is withdrawn backward from the back of the exterior material 110. Note that placement of the leads is not limited to this example. For example, both the positive electrode lead electrically connected to the positive electrode and the negative electrode lead electrically connected to the negative electrode may be provided on one of the front and the back of the exterior material 110.

The structure of the battery 100 is not limited to the structure according to the embodiment. For example, the battery 100 may be a winding type lithium-ion secondary battery. In this example, the positive electrode, the negative electrode, and the separator are wound inside the exterior material 110 as battery elements. The battery 100 may be also a type of battery different from the lithium-ion secondary battery.

The structure 200 is at least partially positioned around the battery 100. The structure 200 according to the embodiment is a housing for housing the battery 100. For example, the structure 200 houses one or a plurality of batteries 100. The structure 200 is made of a material with a relatively high thermal conductivity. For example, the thermal conductivity of the structure 200 is 100 W/m·K or greater. For example, the structure 200 is made of a metal such as aluminum.

The structure 200 may at least partially operate as a member regulating the temperature of the battery 100. For example, the structure 200 can at least partially operate as a cooling member by flowing coolant liquid in the structure 200. The overheat of the battery 100 can be suppressed by the structure 200 at least partially operating as a cooling member. In this case, more aggressive heat exchange can be performed between the battery 100 and the structure 200 compared with natural air cooling of the battery 100. Alternatively, the temperature of the battery 100 needs to be raised when, for example, rapid charge of the battery 100 is performed in use of the battery module 10 at a relatively low temperature about −25° C. In this case, the temperature of the battery 100 can be raised by the structure 200 at least partially operating as a heating member.

The temperature sensor 300 is positioned between the battery 100 and the structure 200. The temperature sensor 300 is, for example, a thermistor. In the embodiment, the temperature sensor 300 is attached to a side of the exterior material 110. For example, the temperature sensor 300 is in direct contact with the side of the exterior material 110. Thus, the temperature sensor 300 is fixed or adhered to the side of the exterior material 110. Note that the position of the battery 100 to which the temperature sensor 300 is attached is not limited to the position according to the embodiment. When the temperature sensor 300 is attached to the battery 100, the temperature sensor 300 can be brought proximate to the battery 100 as compared with a case that the temperature sensor 300 is spaced apart from the battery 100. Accordingly, the detected temperature of the temperature sensor 300 can be brought closer to the actual temperature of the battery 100. The temperature sensor 300 may be however spaced apart from the battery 100.

The thermal shield element 400 is at least partially positioned between the structure 200 and the temperature sensor 300. The thermal conductivity of the thermal shield element 400 is, for example, equal to or greater than 0 and equal to or less than 0.15 W/m·K. The thermal shield element 400 contains, for example, a porous material. Examples of the porous material include porous resin, porous ceramics, and porous glass. The porosity of the porous material is, but not limited to, equal to or greater than 60% and equal to or less than 80%, for example. In the embodiment, the thermal shield element 400 is a thermal shield tape. Examples of the thermal shield element 400 may include ethylene propylene diene monomer (EPDM) foam rubber, silica aerogel, and a glass cloth tape. The thermal shield element 400 covers a periphery of the temperature sensor 300 except the side on which the battery 100 is positioned. Note that the thermal shield element 400 is not limited to this example. For example, the thermal shield element 400 may be a thermal shield member other than the thermal shield tape. The thermal shield element 400 may be also air. For example, when the air around the temperature sensor 300 is not used as a cooling means such as in a case of the battery 100 not being cooled by forced air cooling such as an air flow, the air around the temperature sensor 300 may be the thermal shield element 400.

The thermal shield element 400 functions as a directing portion directing a temperature detection range of the temperature sensor 300 toward the battery 100. Specifically, the temperature of the battery 100 during operation of the battery 100, such as charge or discharge, is higher than the temperature of the structure 200. Thus, if the thermal shield element 400 was not provided during operation of the battery 100, the temperature around the temperature sensor 300 might be lower than the actual temperature of the battery 100 due to a heat flux from the battery 100 to the structure 200. In the embodiment, on the other hand, the thermal shield element 400 is at least partially positioned between the structure 200 and the temperature sensor 300. The thermal shield element 400 can accordingly suppress the heat of the battery 100 from conducting to the structure 200 around the temperature sensor 300. The embodiment can therefore decrease the difference between the actual temperature of the battery 100 and the detected temperature of the temperature sensor 300 as compared with the case that the thermal shield element 400 is not provided.

The reason that the difference between the actual temperature of the battery 100 and the detected temperature of the temperature sensor 300 needs to be decreased is as follows, for example. For example, the battery module 10 may be requested to perform rapid charge or discharge while ensuring safety. Consider an example that in this case the temperature sensor 300 detects the temperature of a relatively high temperature portion of the battery 100. In this example, when the detected temperature of the temperature sensor 300 is lower than the actual temperature of the battery 100, the charge of the battery 100 may be continued despite the actual temperature of the battery 100 greater than a tolerance value. As a result, degradation of the battery 100 may progress, for example. Alternatively, consider an example that the temperature sensor 300 detects the temperature of a relatively low temperature portion of the battery 100. In this example, when the detected temperature of the temperature sensor 300 is higher than the actual temperature of the battery 100, the charge of the battery 100 may be continued despite the actual temperature of the battery 100 less than a tolerance value. As a result, the Li may be deposited on the surface of an electrode of the battery 100, for example. It is therefore necessary to have the difference between the actual temperature of the battery 100 and the detected temperature of the temperature sensor 300 be as small as practicable.

In the embodiment, the temperature sensor 300 and the thermal shield element 400 may be positioned in a region where the absolute value of a heat flux is relatively high under a predetermined condition. For example, the temperature sensor 300 and the thermal shield element 400 may be positioned in a region where the absolute value of a heat flux is 200 W/m² or greater under the predetermined condition. Examples of the region where the absolute value of the heat flux is relatively high under the predetermined condition include a region between the battery 100 and the structure 200 operating as a member adjusting the temperature of the battery 100. Specifically, the difference between the temperature of the battery 100 and the temperature of the structure 200 varies according to conditions such as an operating condition of the battery 100, an environment where the battery 100 is placed, and an operating condition of the structure 200. The above predetermined condition means that the difference between the temperature of the battery 100 and the temperature of the structure 200 is a predetermined value or greater. For example, when the battery 100 generates heat and the structure 200 operates as a cooling member, the heat flux is generated in a direction from the battery 100 toward the structure 200. Under the condition, the difference between the temperature of the battery 100 and the temperature of the structure 200 may become the predetermined value or greater. Alternatively, when the battery 100 is placed at a relatively low temperature and the structure 200 operates as a heating member, the heat flux is generated in a direction from the structure 200 to the battery 100. Under the condition, the difference between the temperature of the battery 100 and the temperature of the structure 200 may become the predetermined value or greater. In the embodiment, even when the temperature sensor 300 and the thermal shield element 400 are positioned in a region where the absolute value of a heat flux is relatively high under the predetermined condition, the detected temperature of the temperature sensor 300 can be brought closer to the actual temperature of the battery 100.

Figure 2:
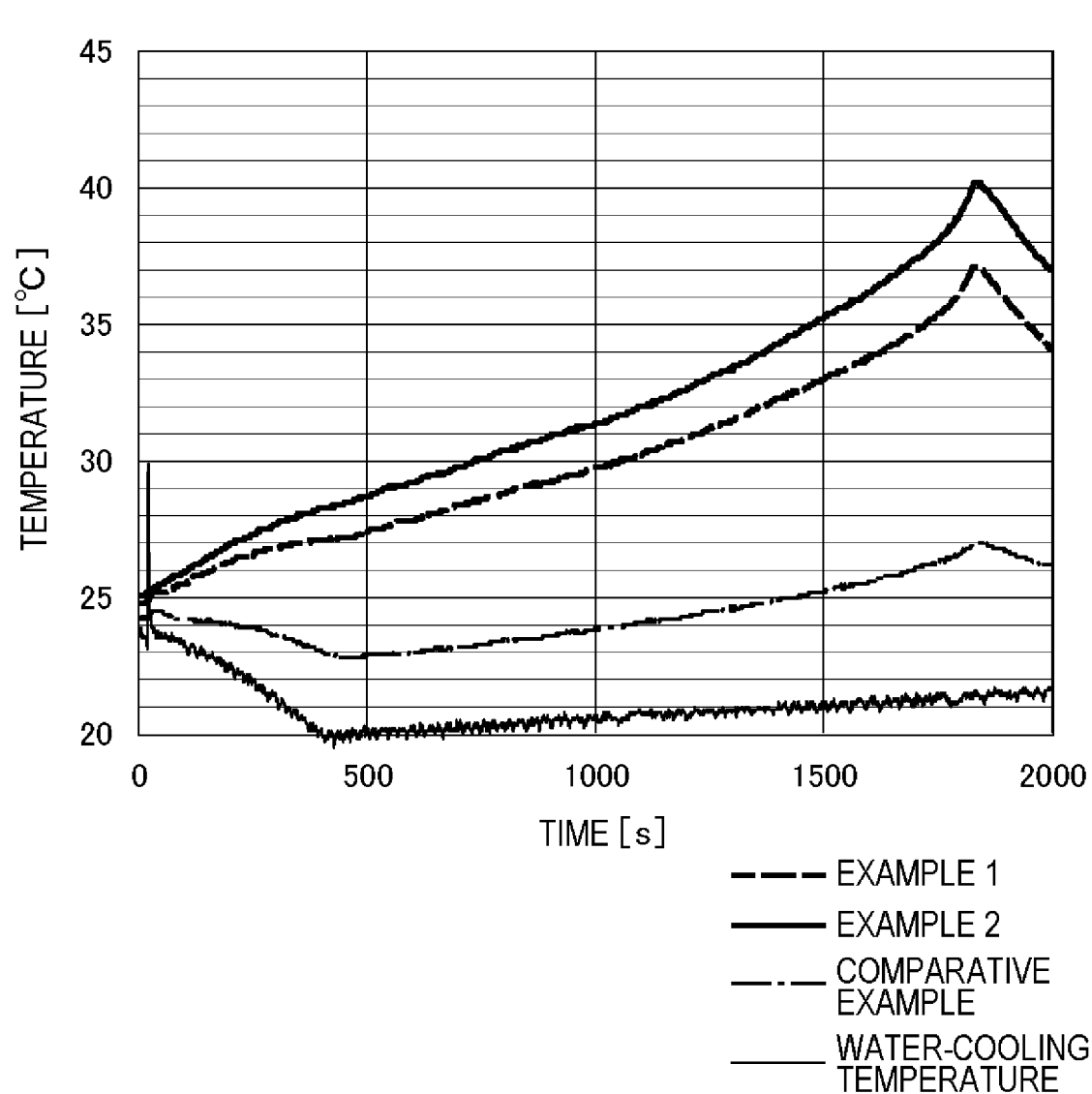
FIG. 2 is a graph illustrating a time variation of the detected temperature of a temperature sensor for each of a battery module according to an example 1, a battery module according to an example 2, and a battery module according to a comparative example, and a time variation of a water-cooling temperature.
Figure 3:
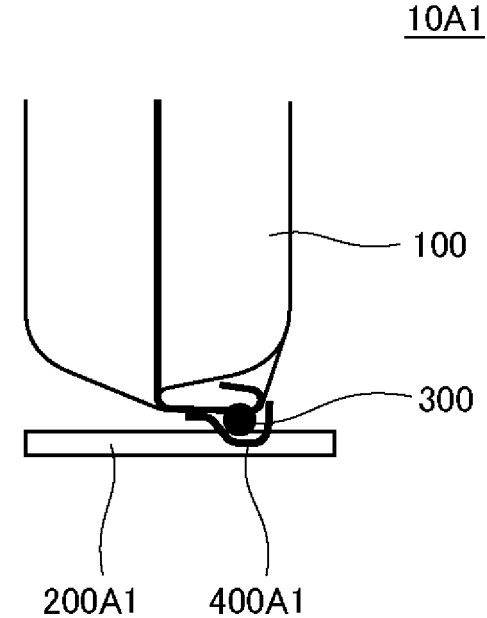
FIG. 3 is a front view of a portion of the battery module according to the example 1.
Figure 4:
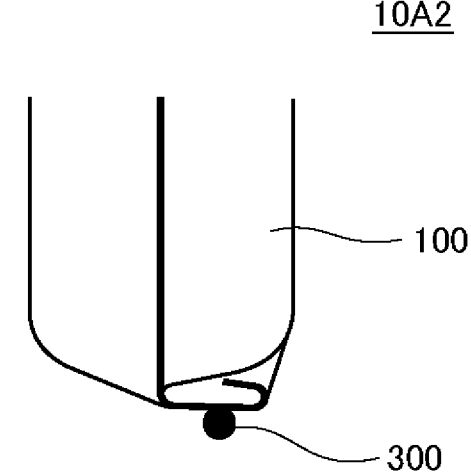
FIG. 4 is a front view of a portion of the battery module according to the example 2.
Figure 5:
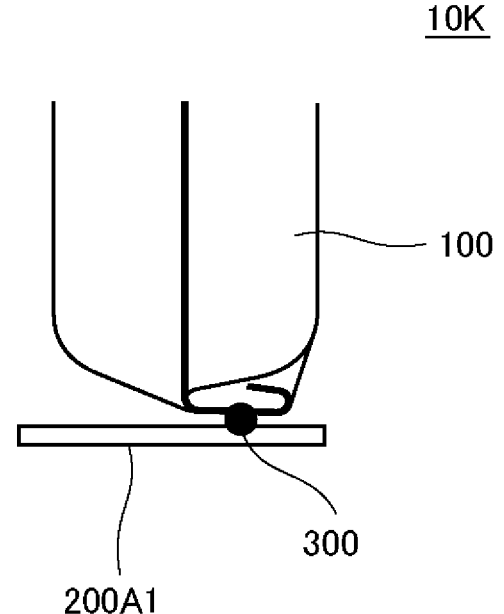
FIG. 5 is a front view of a portion of the battery module according to the comparative example.

FIG. 2 is a graph illustrating a time variation of the detected temperature of the temperature sensor 300 for each of a battery module 10A1 according to an example 1, a battery module 10A2 according to an example 2, and a battery module 10K according to a comparative example, and a time variation of a water-cooling temperature. The horizontal axis of the graph illustrated in FIG. 2 represents time (unit: seconds). The vertical axis of the graph illustrated in FIG. 2 represents temperature (unit: ° C.). FIG. 3 is a front view of a portion of the battery module 10A1 according to the example 1. FIG. 4 is a front view of a portion of the battery module 10A2 according to the example 2. FIG. 5 is a front view of a portion of the battery module 10K according to the comparative example.

As illustrated in FIG. 3, the battery module 10A1 according to the example 1 includes a battery 100, a thermal conductive sheet 200A1, a temperature sensor 300, and a thermal shield tape 400A1. The thermal conductive sheet 200A1 is provided on a side of the battery 100. The temperature sensor 300 is positioned between the battery 100 and the thermal conductive sheet 200A1. The thermal shield tape 400A1 covers a periphery of the temperature sensor 300 except the side on which the battery 100 is positioned. In the example 1, the battery 100 is continuously discharged at 2.0 C. An unillustrated water-cooling member is provided on the surface of the thermal conductive sheet 200A1 opposite to the side on which the battery 100 is positioned.

The battery module 10A2 according to the example 2 is similar to the battery module 10A1 according to the example 1 except for the following point. As illustrated in FIG. 4, the battery module 10A2 according to the example 2 does not include a thermal conductive sheet and a thermal shield tape. The air exists around the temperature sensor 300 except a side on which the battery 100 is positioned.

The battery module 10K according to the comparative example is similar to the battery module 10A1 according to the example 1 except for the following point. As illustrated in FIG. 5, the battery module 10K according to the comparative example does not include a thermal shield tape. The temperature sensor 300 is in contact with the thermal conductive sheet 200A1.

The water-cooling temperature indicated in FIG. 2 represents the temperature of cooling water, at an inlet, flowing into an unillustrated cooling member.

As illustrated in FIG. 2, in the example 1 and the example 2, the detected temperature of the temperature sensor 300 increases over time from 0 second to around 1750 seconds. In the comparative example, on the other hand, the detected temperature of the temperature sensor 300 does not increase from 0 second to around 1750 seconds as compared with the example 1 and the example 2. The result suggests that the difference between the actual temperature of the battery and the detected temperature of the temperature sensor can be decreased by a thermal shield element, such as a thermal shield tape or the air, existing between the battery and the structure such as a thermal conductive sheet or a water-cooling member.

Figure 6:
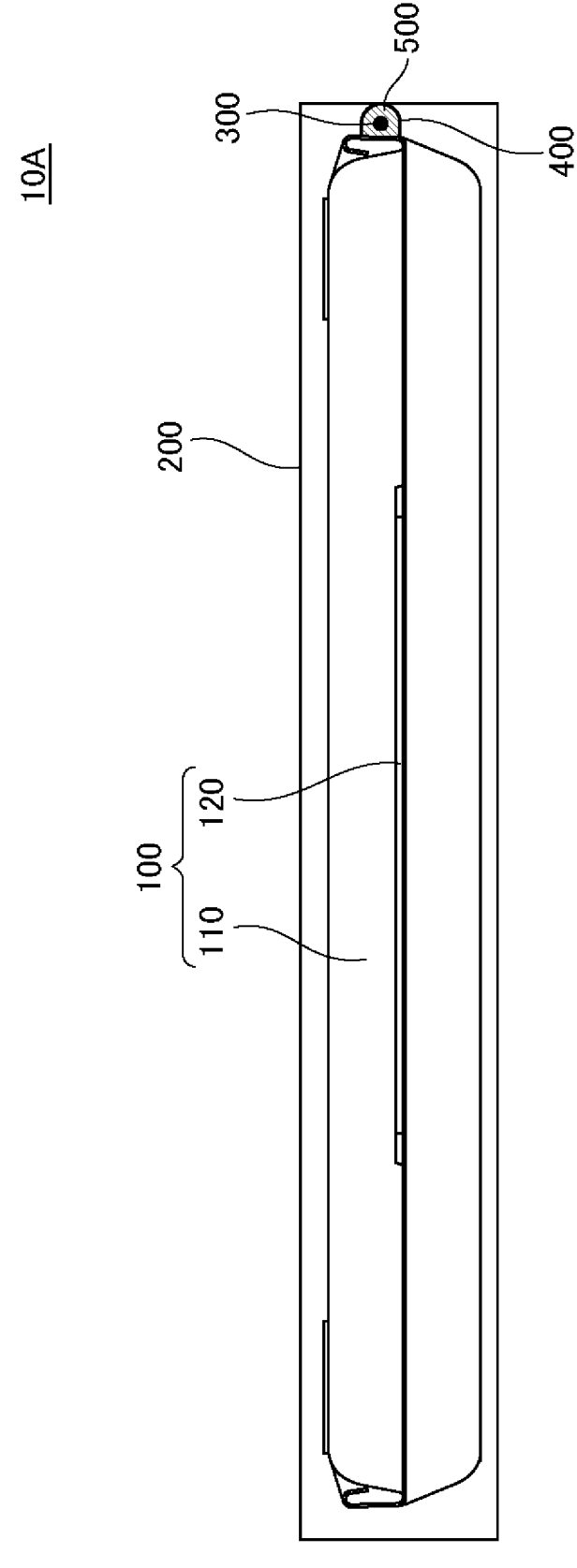
FIG. 6 is a front view of a battery module according to a variant.

FIG. 6 is a front view of a battery module 10A according to a variant. The battery module 10A according to the variant is similar to the battery module 10 according to the embodiment except that a thermal conductive element 500 is provided.

The thermal conductive element 500 according to variant is positioned between the outer surface of a temperature sensor 300 and the inner surface of a thermal shield element 400. The thermal conductivity of the thermal conductive element 500 is, for example, 0.20 W/m·K or greater. The thermal conductive element 500 contains, for example, a metal such as Al or Cu. Specifically, the thermal conductive element 500 may be, for example, a heat spreader tape such as an Al tape or a Cu tape. The thermal conductive element 500 conducts the heat generated by the battery 100 and blocked by the thermal shield element 400 toward the temperature sensor 300. Accordingly, the heat generated by the battery 100 can be more efficiently conducted to the temperature sensor 300 by the thermal conductive element 500.

While the embodiment and the variant of the present invention have been described above with reference to the drawings, the embodiment and the variant are exemplifications of the present invention, and various configurations other than those described above may be employed.

It is apparent that the present invention is not limited to the above embodiment, and may be modified and changed without departing from the scope and spirit of the invention.

What is claimed is:

1. A battery module comprising:
   a battery including a lead on at least a side of the battery in a first direction, the battery having a width in a second direction of the battery perpendicular to the first direction and a thickness in a third direction of the battery perpendicular to both of the first direction and the second direction, the thickness being less than the width;
   a structure positioned at least partially around the battery;
   a temperature sensor positioned between the battery and the structure; and
   a thermal shield element at least partially positioned between the temperature sensor and the structure, wherein
   at least a portion of the structure is positioned perpendicular to the second direction of the battery, and
   the thermal shield element is in direct contact with the at least the portion of the structure.

2. The battery module according to claim 1, wherein the thermal shield element is positioned in a region where an absolute value of a heat flux is 200 W/m$^2$ or greater under a predetermined condition.

3. The battery module according to claim 1, wherein the thermal shield element contains a porous material.

4. The battery module according to claim 1, wherein the temperature sensor is positioned in a region where an absolute value of a heat flux is 200 W/m$^2$ or greater under a predetermined condition.

5. The battery module according to claim 1, wherein the structure at least partially operates as a member adjusting a temperature of the battery.

6. The battery module according to claim 1, wherein the temperature sensor is attached to the battery.

7. The battery module according to claim 1, wherein a porosity of the thermal shield element is equal to or greater than 60% and equal to or less than 80%.

8. The battery module according to claim 1, wherein the structure includes an edge positioned perpendicular to the second direction of the battery, and the thermal shield element is positioned at the edge of the structure.

9. The battery module according to claim 1, wherein a thermal conductivity of the thermal shield element is equal to or greater than 0 and equal to or less than 0.15 W/m·K.

10. The battery module according to claim 1, wherein the battery includes a second side at which the temperature sensor is disposed, the second side of the battery and the thermal shield element are in direct contact with each other such that the temperature sensor is surrounded by the second side of the battery and the thermal shield element.

11. The battery module according to claim 1, wherein the thermal shield element is positioned between a member adjusting a temperature of the battery and the temperature sensor.

12. The battery module according to claim 1, wherein the battery includes a second side at which the temperature sensor is disposed, and the thermal shield element is in direct contact with the second side of the battery.

13. The battery module according to claim 1, wherein the thermal shield element functions as a directing portion directing a temperature detection range of the temperature sensor toward the battery.

14. The battery module according to claim 13, wherein the thermal shield element is positioned in a region where an absolute value of a heat flux is 200 W/m$^2$ or greater under a predetermined condition.

15. The battery module according to claim 13, wherein the thermal shield element contains a porous material.

16. The battery module according to claim 13, wherein the temperature sensor is positioned in a region where an absolute value of a heat flux is 200 W/m$^2$ or greater under a predetermined condition.

17. The battery module according to claim 13, wherein the structure at least partially operates as a member adjusting a temperature of the battery.

18. The battery module according to claim 13, wherein the temperature sensor is attached to the battery.

19. A battery module comprising:
a battery;
a structure positioned at least partially around the battery;
a temperature sensor positioned between the battery and the structure; and
a thermal shield element at least partially positioned between the temperature sensor and the structure, wherein
a porosity of the thermal shield element is equal to or greater than 60% and equal to or less than 80%.

20. A battery module comprising:
a battery including a lead on at least a side of the battery in a first direction, the battery having a width in a second direction of the battery perpendicular to the first direction and a thickness in a third direction of the battery perpendicular to both of the first direction and the second direction, the thickness being less than the width;
a structure positioned at least partially around the battery;
a temperature sensor positioned between the battery and the structure; and
a thermal shield element at least partially positioned between the temperature sensor and the structure, wherein
the structure includes an edge positioned perpendicular to the second direction of the battery, and
the thermal shield element is positioned at the edge of the structure.

* * * * *